United States Patent Office 3,364,152
Patented Jan. 16, 1968

3,364,152
PROCESS FOR THE MANUFACTURE OF A BORON, ALUMINUM OR ALKALINE EARTH METAL, AND CARBON COMPOSITION AND PRODUCT
Alfred Lipp, Sankt Mang, Germany, assignor to Elektroschmelzwerk Kempten G.m.b.H., Munich, Germany
No Drawing. Filed Apr. 24, 1964, Ser. No. 362,487
Claims priority, application Germany, Jan. 23, 1964, E 26,282
11 Claims. (Cl. 252—478)

This invention relates to compositions comprising boron, aluminum and carbon, and to novel methods of producing same.

Extremely hard products comprising boron, carbon and aluminum have previously been produced. Such compositions contained 2–5% of aluminum in the free, or at least not bound to oxygen form, the remainder of the composition constituting the boron and the carbon in the form of boron carbide varying in composition between $B_{3.8}C$ and $B_{5.4}C$. Such compositions were produced by heating boron carbide of $B_{3.8}C$–$B_{5.4}C$ composition with an excess of aluminum in a graphite mold at a pressure of at least 35 kg./cm.$^2$ at a temperature ranging from 1800 to 1900° C., $Al_4C_3$ being formed if a temperature below 1800° C. was used. The composition produced by this method under pressure and heat must be ground to the desired grain size, with great difficulty because of its extreme hardness.

Borides of the alkaline earth metals have also previously been produced by reacting mixtures of a finely divided alkaline earth metal and finely divided boron in a protective gas atmosphere. Magnesium tetraboride, for example, could be produced in this manner by heating a mixture of finely divided boron and magnesium either in the presence of an inert atmosphere or in vacuo to a temperature ranging from 900 to 1200° C., followed by treating the resulting reaction mixture with dilute acids to remove everything except the magnesium tetraboride.

According to still another method, amorphous boron and beryllium oxide are reacted with each other in an electric furnace, whereby a hard, crystalline, insoluble crystalline residue is obtained.

It has also previously been disclosed that calcium and $B_2O_3$ will react with each other with the formation of $CaB_6$ when the mixture is heated to a dark red glow.

It has now been discovered that from boron, alkaline earth metal or aluminum, and carbon, there can be produced either a mixture of an alkaline earth carbide and alkaline earth boride or only alkaline earth boride with some unreacted boron carbide present; or a mixture of aluminum carbide and aluminum boride or only aluminum boride with some unreacted boron carbide present.

This result can be accomplished in the following manners:

(a) By heating a finely divided mixture of boron carbide and aluminum to a temperature of at least 1000° C., and preferably to 1400–1500° C. in an inert atmosphere. It is desirable to use an aluminum powder with an oxygen assay of not greater than 5%, although one with a higher oxygen assay can be used. It is also found advantageous to use an excess of aluminum. In connection with this reaction, it is surprising to note that although aluminum melts at 660° C., no separation of aluminum and boron carbide takes place at the temperature of 1000–1500° C. employed in the operation, a factor which makes the procedure much easier.

(b) By reacting a mixture of boron carbide and an alkaline earth metal, at a temperature above 600° C., and preferably within the range of 800–1500° C., in an inert atmosphere, such as hydrogen.

The reactions above described will be greatly facilitated if the boron carbide has a very great surface, i.e. if very fine grains thereof are employed. In the case of the borides of the alkaline earth metals which are produced at relatively low temperatures, the fineness of the grinding is of lesser importance. Any known method can be used for obtaining the boron carbide in the desired degree of fineness.

In carrying out the above reactions the ratio of boron to carbon appears to be of little importance. For example, use may be made of boron carbide high in carbon, such as $B_{2.65}C$ for which there are few industrial uses. Or, use may be made of carbides high in boron, such as $B_5C$. Yet in spite of these great differences in the starting boron carbides, the procedures of the present invention permit the production of final products, which after completion of the reaction and the treatment of the residue with acids or other conventional method for the separation of the undesired by-products, are remarkably constant in composition.

As previously indicated, the reaction is preferably carried out in an inert atmosphere. For this purpose a stream of hydrogen or argon can be conveniently used. Other gases inert under the conditions of the reaction may, however, be used. It is important, however, that the gas used does not contain any carbon compound such as carbon monoxide.

A preferred composition of the type contemplated by this invention is one which contains boron, aluminum and carbon in which chemically bound aluminum is present to the extent of about 7–20%, and chemically bound carbon to the extent of about 12–16%, the remainder being boron.

In carrying out the invention of the present invention stoichiometric amounts of the boron carbide and alkaline earth metal are preferably used, although it is possible to use an excess of either type of reactant so as to affect the properties of the final product in any desired manner.

In the process of the present invention it is possible to effect the desired reaction at substantially lower temperatures than in previous processes for carrying out similar reactions. Temperatures above those effective for the reaction may, however, be employed with the result that the rate of the reaction will be correspondingly increased.

A particular advantage of the procedure of the present invention consists in rendering it possible to obtain an alkaline earth boride which is substantially free from carbon, the alkaline earth carbide formed in the process being separated from the reaction mixture in accordance with known procedures. For example, the reaction product is first treated with water, some hydrolysis products remaining which can then be completely removed by acid treatment. Or, the reaction product may simply be subjected to acid treatment.

An especial advantage of the process of the present invention lies in the fact that it permits the substantially complete reaction of the boron and carbon present in the starting materials and the production of products of technical importance. When $B_2O_3$ is used as the source of boron, as in the procedures of the prior art, metal oxides are produced in the reaction and can only be separated from the reaction products with the greatest of difficulty. It is well known that the preparation of pure alkaline earth borides could only be accomplished with the greatest of difficulty by prior processes, as compared to the relative simplicity and ease by the process of the present invention.

Still another advantage of the process of the present invention lies in the fact that it requires substantially smaller quantities of the valuable starting materials than in the case of the processes of the prior art. Thus, in the case of $CaB_6$ only ⅙ as much would be required for the production of the desired product.

The process of the present invention will be illustrated by the following specific examples. It is understood, however, that variations from the procedures of these specific examples can be employed without departing from the concept of the invention disclosed and claimed herein.

The hard products rich in boron produced by the process of the present invention can also be used as grinding agents in loose or bonded form besides their use as fireproof materials. Because of the high temperature and oxidation resistance they are preferred as fireproof materials, while the high boron content enables their use as neutron absorber in the field of atomic energy.

EXAMPLE I

A dry shaped article pressed from a mixture of powdered boron carbide and powdered aluminum was placed in a combustion boat in a silite tube furnace provided with a ceramic protective tube. The article was then subjected to the temperatures shown in Table I below, using either hydrogen or argon as the inert gas. Instead of using a dry article one containing a volatile binder, such as trichlorethylene gave similar results.

Table I

The boron carbide used in each experiment had a boron content of 78.2% and a carbon content of 21.8%.

| Expt. No. | React. Time, hours | Sintering Temp., °C. | Inert Gas | Gas Stream Velocity, l./h. | Analysis of Product after Treatment in 1:5 HCl (percent) | | |
|---|---|---|---|---|---|---|---|
| | | | | | B | Al | C |
| 1 | 4.5 | 1,450 | H₂ | 5 | 75.5 | 10.0 | 14.4 |
| 2 | 24 | 1,450 | H₂ | 5 | 76.1 | 9.7 | 13.8 |
| 3 | 4.5 | 1,450 | H₂ | 30 | 76.0 | 10.0 | 13.8 |
| 4 | 4.5 | 1,450 | Ar | 5 | 77.2 | 8.9 | 14.0 |
| 5 | 4.5 | 1,200 | H₂ | 5 | 76.0 | 8.0 | 15.8 |

Experiments 1 and 3 of the above table show that the rate of flow of the inert gas had little effect on the carbon assay in the end product.

Extension of the reaction time from 4½ to 24 hours had little effect, as is shown by a comparison of Experiments 1 and 2.

Experiments 1 and 5, however, show that the reaction temperature is significant. In Experiment 5 the alumiunm assay had the lowest value whereas the carbon was the highest. This shows that under otherwise similar reaction conditions the aluminum assay of the end product rose with increases in the reaction temperature, whereas the carbon assay dropped.

If the end product of Experiment 1 in Table I above is again reacted after the acid treatment with an excess of aluminum the chemically bound aluminum assay of the end product was increased, as shown in Table II below, whereas the assay of the chemically bound carbon dropped.

Table II

The starting material, as shown in line 1 of Table I, was composed of 75.5% boron, 10.0% aluminum and 14.4% carbon.

| Expt. No. | React. Time, hours | Sintering Temp., °C. | Inert Gas | Gas Stream Velocity, l./h. | Analysis of Product after Treatment in 1:5 HCl (percent) | | |
|---|---|---|---|---|---|---|---|
| | | | | | B | Al | C |
| 6 | 4.5 | 1,200 | H₂ | 5 | 73.9 | 12.3 | 13.4 |
| 7 | 4.5 | 1,450 | H₂ | 5 | 73.7 | 13.2 | 12.8 |

EXAMPLE II

An intimate mixture of 50 parts by weight of boron carbide and 50 parts by weight of beryllium metal was prepared and the resulting mixture reacted in a high melting crucible at a temperature of 1300° in an atmosphere of hydrogen. In order to obtain pure beryllium boride the resulting reaction mixture was treated with dilute acetic acid. There was thus obtained a product having a boron assay of 69.7% and a beryllium assay of 30.1%. The density of the beryllium boride was 2.31 g./ccm., and its Knoop hardness was 3200 kg./mm.² under a load of 100 g. The reaction apparently took place in accordance with the following equation:

$$B_4C + 4Be \rightarrow 2BeB_2 + Be_2C$$

EXAMPLE III

An intimate mixture of 65 parts by weight of finely divided magnesium metal and 35 parts by weight of finely divided boron carbide was heated in a combustion boat of sintered carborundum for four hours at 750° C. in an atmosphere of hydrogen. The resulting reaction product dissolved completely in dilute, hot mineral acids (hydrochloric or sulfuric). As an indication of this it might be noted that during the acid treatment the typical odor of boron hydride was observed.

The evaporation of the magnesium is lowered by raising the pressure at which the reaction takes place and accordingly the reaction equilibrium is shifted and the yields are improved.

What is claimed is:

1. Process for the manufacture of boride-containing compositions which comprises reacting at elevated temperatures boron carbide with a material selected from the group consisting of finely divided aluminum metal and finely divided alkaline earth metals, and recovering the boride-containing compositions from the reaction products.

2. Process for the manufacture of boride-containing compositions which comprises heating in an inert atmosphere to temperatures ranging from 600 to 1500° C. a mixture of finely divided boron carbide and a finely divided material selected from the group consisting of aluminum metal and alkaline earth metals, the reaction temperature ranging from 1000 to 1500° C. in the case of aluminum metal, and from 600 to 1500° C. in the case of the alkaline earth metals, and recovering from the reaction products boride-containing compositions.

3. The process of claim 2 wherein the preferred reaction temperature ranges from 1400 to 1500° C. when aluminum metal is reacted.

4. The process of claim 2 wherein the preferred reaction temperature ranges from 800 to 1500° C. when the reactant is an alkaline earth metal.

5. The process of claim 2 wherein the reaction is effected in the presence of an atmosphere of hydrogen gas.

6. The process of claim 2 wherein a stoichiometric excess of the metal is used as a reactant.

7. The process of claim 2 wherein the boron carbide may range in composition from $B_{2.65}C$ to $B_5C$.

8. The process of claim 2 wherein the boron carbide has the composition of 78.2%, by weight, boron and 21.2%, by weight, carbon.

9. The process of claim 2 wherein 50 parts by weight of boron carbide are reacted with 50 parts by weight of beryllium metal.

10. The process of claim 2 wherein 65 parts by weight of magnesium metal are reacted with 35 parts by weight of boron carbide.

11. Compositions suitable for use as neutron absorbers consisting of boron, aluminum and carbon, with the overall composition $B_{12}C_2Al$, having a boron carbide structure and showing a region of homogeneity of 7–20%, by weight aluminum and 12–16%, by weight carbon, and the remainder being boron.

References Cited

UNITED STATES PATENTS

| | | | |
|---|---|---|---|
| 3,108,886 | 10/1963 | Adamsky et al. | 252—478 |
| 3,153,636 | 10/1964 | Shanta et al. | 252—478 |
| 2,746,133 | 5/1956 | Lowe | 75—204 XR |
| 3,178,807 | 4/1965 | Bergmann | 75—204 XR |

FOREIGN PATENTS

| | | |
|---|---|---|
| 878,465 | 9/1961 | Great Britain. |
| 884,577 | 12/1961 | Great Britain. |

OTHER REFERENCES

TID–3032, Radiation Shields and Shielding, September 1952, pp. 16 and 17, paragraph 99.

Nuclear Power, Shielding, December 1960, p. 89.

Mellor, J. W., Mellor's Modern Inorganic Chemistry, N.Y., Longmans, Green and Co., 1952. QD 151 M52 C–4 (p. 644).

CARL D. QUARFORTH, *Primary Examiner.*

BENJAMIN R. PADGETT, *Examiner.*

S. J. LECHERT, JR., *Assistant Examiner.*